United States Patent
Mitobe et al.

(10) Patent No.: US 10,459,183 B2
(45) Date of Patent: Oct. 29, 2019

(54) OPTICAL WIRING UNIT

(71) Applicant: FUJIKURA LTD., Tokyo (JP)

(72) Inventors: Ryoichi Mitobe, Chiba (JP); Norihiro Momotsu, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 16/175,939

(22) Filed: Oct. 31, 2018

(65) Prior Publication Data
US 2019/0137713 A1 May 9, 2019

(30) Foreign Application Priority Data
Nov. 8, 2017 (JP) .................................. 2017-215703

(51) Int. Cl.
*G02B 6/00* (2006.01)
*G02B 6/44* (2006.01)

(52) U.S. Cl.
CPC .................................. *G02B 6/4452* (2013.01)

(58) Field of Classification Search
CPC .................................................... G02B 6/4452
See application file for complete search history.

(56) References Cited

U.S. PATENT DOCUMENTS

| | | | | |
|---|---|---|---|---|
| 9,116,324 | B2 * | 8/2015 | Cooke | G02B 6/4452 |
| 9,690,065 | B2 * | 6/2017 | Wiltjer | G02B 6/4453 |
| 2014/0079365 | A1 * | 3/2014 | Hill | G02B 6/4455 |
| | | | | 385/135 |
| 2016/0062068 | A1 * | 3/2016 | Giraud | G02B 6/3825 |
| | | | | 385/135 |
| 2018/0372977 | A1 * | 12/2018 | Vermeulen | G02B 6/4455 |

FOREIGN PATENT DOCUMENTS

| | | |
|---|---|---|
| CN | 206235764 U | 6/2017 |
| JP | 2004-157485 A | 6/2004 |
| JP | 2008233535 A | 10/2008 |
| JP | 2017531205 A | 10/2017 |

OTHER PUBLICATIONS

Notice of Reasons for Refusal issued in corresponding Japanese Patent Application No. 2017-215703, with translation, dated Jun. 4, 2019 (5 pages).

* cited by examiner

*Primary Examiner* — Ellen E Kim
(74) *Attorney, Agent, or Firm* — Osha Liang LLP

(57) ABSTRACT

An optical wiring unit includes a plurality of drawers with optical adapters. Each of the drawers includes a first latch part and a second latch part. When any of the drawers are drawn out to a predetermined position, the first latch part of a drawn-out drawer latches on the second latch part of an adjacent drawer to lock the drawn-out drawer to the predetermined position.

6 Claims, 8 Drawing Sheets

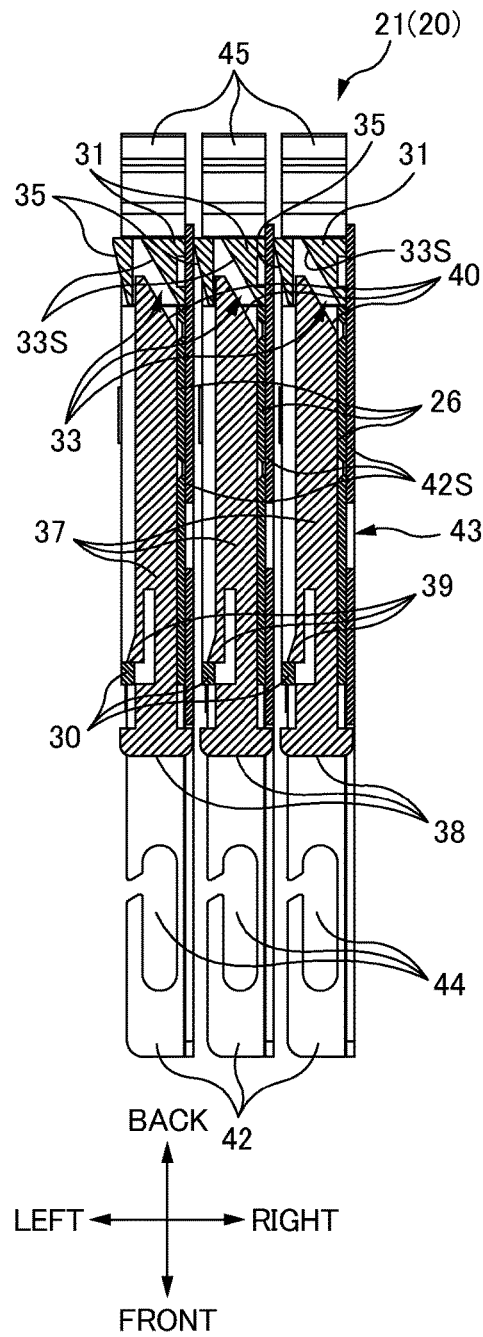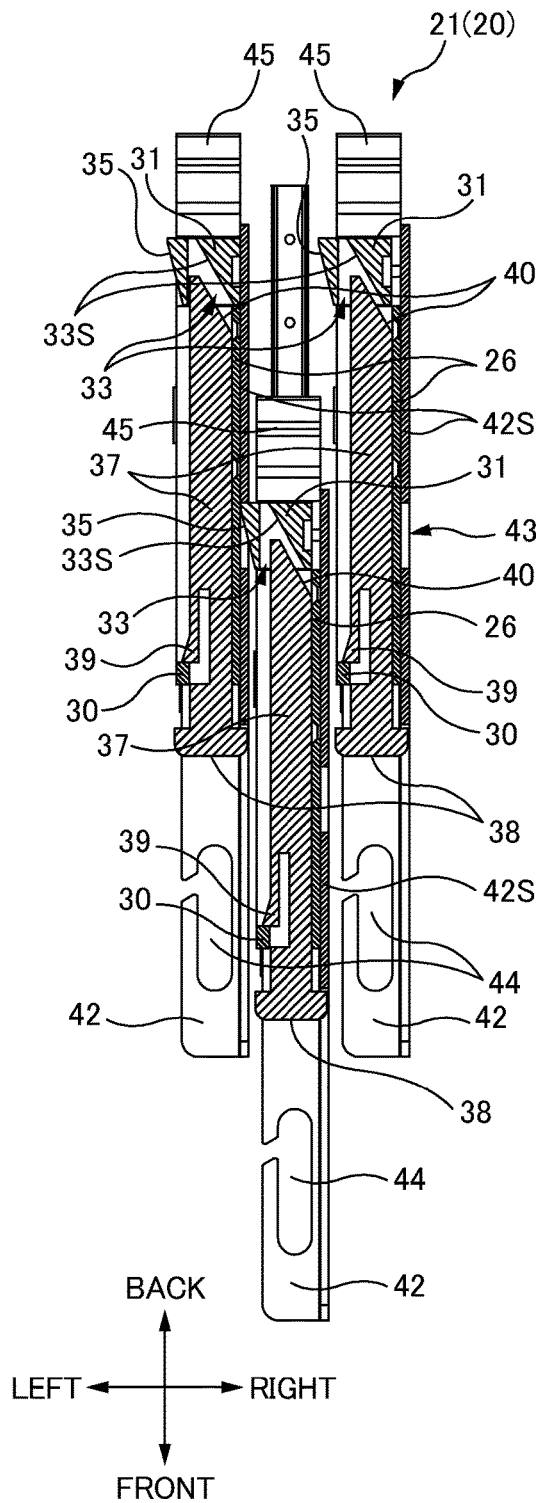
FIG. 5A
FIG. 5B

OPTICAL WIRING UNIT

CROSS-REFERENCE TO RELATED APPLICATIONS

The present application claims priority to Japanese Patent Application No. 2017-215703 filed on Nov. 8, 2017, which is incorporated by reference in its entirety.

BACKGROUND

1. Technical Field

The present invention relates to an optical wiring unit.

2. Background

There has been known an optical wiring unit constituting an optical wiring board, an optical wiring box, or the like, in which an optical parts housing tray is inserted and housed in a frame body thereof (see, Patent Literature 1: JP 2004-157485A, for example). The optical wiring unit disclosed in Patent Literature 1 has optical parts housing trays stacked in plural stages, a frame body supporting the individual trays to be drawn out and pushed inward, and a stopper attached to cover the frame body.

According to the optical wiring unit disclosed in Patent Literature 1, when a worker draws out an optical parts housing tray to a work position, a step part formed on the optical parts housing tray abuts on a comb-like toothed member formed on the stopper to prevent the optical parts housing tray from being drawn out. On the other hand, when the worker raises locking members attached on both lateral sides of the optical parts housing tray by his/her fingers, the optical parts housing tray is prevented from being pushed inward. For this reason, the worker can draw out only the needed optical parts housing tray and lock the tray at a drawn-out position to easily perform an insertion and removal operation of an optical connector into and from an optical adapter which is provided to the optical parts housing tray.

Patent Literature 1: JP 2004-157485A

For example, when an optical cable having optical fibers with multiple cores is used to connect devices located in different buildings with each other, the optical parts housing trays each provided with a plurality of optical adapters may be arranged in the frame body in plural stages in the optical wiring unit. At this time, the optical wiring unit as disclosed in Patent Literature 1 may not be able to arrange the optical adapters in a high density due to restriction imposed by arrangement of the stopper or catching members. In other words, the stopper disclosed in Patent Literature 1 is attached to cover the frame body, which restricts a degree of freedom for the arrangement of the optical parts housing trays which are provided with a plurality of optical adapters. Since many optical fiber cables extend from the optical adapters arranged in a high density, these many optical fiber cables are obstacles to raising the catching members by the fingers, which may reduce operability.

SUMMARY

According to one or more embodiments of the present invention, a high density of a plurality of optical adapters provided to the optical wiring unit can be easily achieved.

According to one or more embodiments of the present invention, an optical wiring unit includes a plurality of drawers provided with optical adapters, wherein each of the drawers includes a first latch part and a second latch part, and when any of the plurality of drawers is drawn out to a predetermined position, the first latch part of drawn-out drawer latches on the second latch part of another adjacent drawer to lock the drawn-out drawer to the predetermined position.

Other features of the invention are made clear by the following description and the drawings.

According to one or more embodiments of the present invention, a high density of a plurality of optical adapters provided to the optical wiring unit can be easily achieved.

BRIEF DESCRIPTION OF THE DRAWINGS

FIGS. 5A and 5B are each a cross-sectional view illustrating the locking section 25 when a drawer 21 is drawn out.

DETAILED DESCRIPTION

At least the following matters are made clear from the following description and the drawings.

An optical wiring unit is disclosed which includes a plurality of drawers provided with optical adapters, wherein each of the drawers includes a first latch part and a second latch part, and when any of the plurality of drawers is drawn out to a predetermined position, the first latch part of drawn-out drawer latches on the second latch part of another adjacent drawer to lock the drawn-out drawer to the predetermined position. According to the optical wiring unit with this configuration, a high density of a plurality of optical adapters provided to the optical wiring unit can be easily achieved.

In one or more embodiments, the second latch part is provided at a distance from the first latch part in a drawing-out direction, the distance being a movement distance of the drawn-out drawer when the drawn-out drawer is drawn out to the predetermined position. This allows the first latch part to latch on the second latch part of the adjacent drawer by only drawing out the drawer to a predetermined position.

In one or more embodiments, the first latch part is urged toward another adjacent drawer. This allows the first latch part to latch on the second latch part of the adjacent drawer by only drawing out the drawer to a predetermined position.

In one or more embodiments, the first latch part is a locking section and the second latch part is an engaging hole to which the locking section is engaged. This allows the first latch part to latch on the second latch part of the adjacent drawer by only drawing out the drawer to a predetermined position.

In one or more embodiments, the optical wiring unit further includes a lock releasing mechanism that releases locking of the drawn-out drawer to the predetermined position. This can push inward again the drawer which is drawn out and locked at a predetermined position.

In one or more embodiments, the lock releasing mechanism includes an insertion member inserted between the first latch part and the second latch part. This can release latching of the first latch part which has latched on the second latch part of the adjacent drawer.

Figure 1:
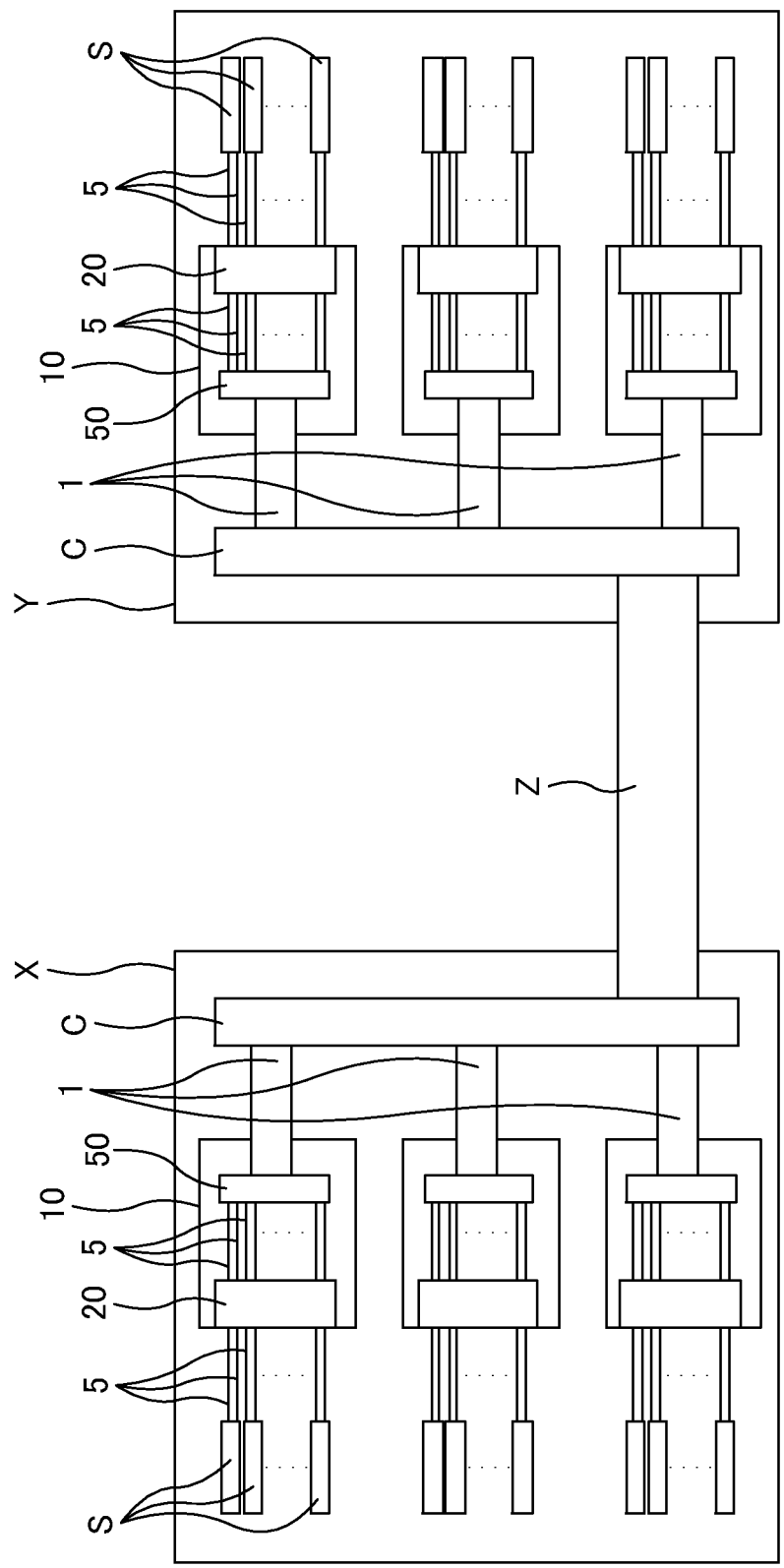
FIG. 1 is a block diagram illustrating a state of optical fiber wiring using optical connection boxes 10 according to one or more embodiments.

Optical Connection Box 10:

FIG. 1 is a block diagram illustrating a state of optical fiber wiring using optical connection boxes 10 according to one or more embodiments. FIG. 1 illustrates an example of using the optical connection boxes 10 according to one or more embodiments as an example in a case that a plurality of devices S located in a building X are connected with a plurality of devices S located in a building Y through optical fibers. In FIG. 1, for the purpose of easy description, corresponding devices in the building X and the building Y (e.g., devices S, optical connection boxes 10, connecting sections C, etc.) are the same each other in structure, but the structure of the corresponding devices may be different between the building X and the building Y. Note that, in the example illustrated in FIG. 1, each device S is a server device housed in a server rack, for example. However, the device S is not limited to the server device, and may be another device.

As illustrated in FIG. 1, the building X and the building Y are connected with each other through a large diameter optical cable Z. The large diameter optical cable Z is an optical cable having a large diameter and many optical fibers. The number of the optical fibers contained in the large diameter optical cable Z (the number of cores) is 3000 or more, for example. However, the number of cores of optical fibers contained in the large diameter optical cable Z is not limited to the above.

As illustrated in FIG. 1, the large diameter optical cable Z is connected via the connecting section C to optical cables 1 which are thinner in a diameter than the large diameter optical cable Z. Furthermore, the large diameter optical cable Z is connected to a plurality of optical cables 1. Note that, in one or more embodiments, the large diameter optical cable Z and a plurality of optical cables 1 are connected by fusing, but the large diameter optical cable Z and a plurality of optical cables 1 may be connected by another method. The number of optical fibers (the number of cores) contained in the optical cable 1 is 288, for example. However, the number of cores of optical fibers contained in the optical cable 1 is not limited to the above.

In one or more embodiments, each of the optical cables 1 connected to the large diameter optical cable Z via the connecting section C is branched into optical fibers 5 contained in the optical cable 1 in a corresponding optical connection box 10. Furthermore, in one or more embodiments, each branched optical fiber 5 is terminated in the optical connection box 10. The optical connection box 10 includes a branch section 50 and the optical wiring unit 20. The branch section 50 is a member to branch the optical cable 1 containing a plurality of optical fibers 5 into the optical fibers 5. The optical wiring unit 20 is a member to attach an optical connector or the like to an end of the optical fiber 5 branched by the branch section 50 for termination. For example, in the case that the number of optical fibers 5 (the number of cores) contained in the optical cable 1 is 288, the optical cable 1 is branched into 288 single-core optical fibers 5 by the branch section 50. Moreover, 288 single-core optical fibers 5 branched by the branch section 50 are provided with the optical connectors by the optical wiring unit 20 for, for example, every optical fiber 5. In FIG. 1, some optical fibers 5 of a plurality of optical fibers 5 are adequately omitted in the illustration.

As illustrated in FIG. 1, each of the devices S located in the building X and the building Y is connected through the optical fibers 5 to some optical connectors of a plurality of optical connectors provided in the optical wiring unit 20. As described above, in one or more embodiments, the optical connection box 10 is used to connect a plurality of devices S located in the building X and a plurality of devices S located in the building Y with each other through the optical fibers.

Figure 2:
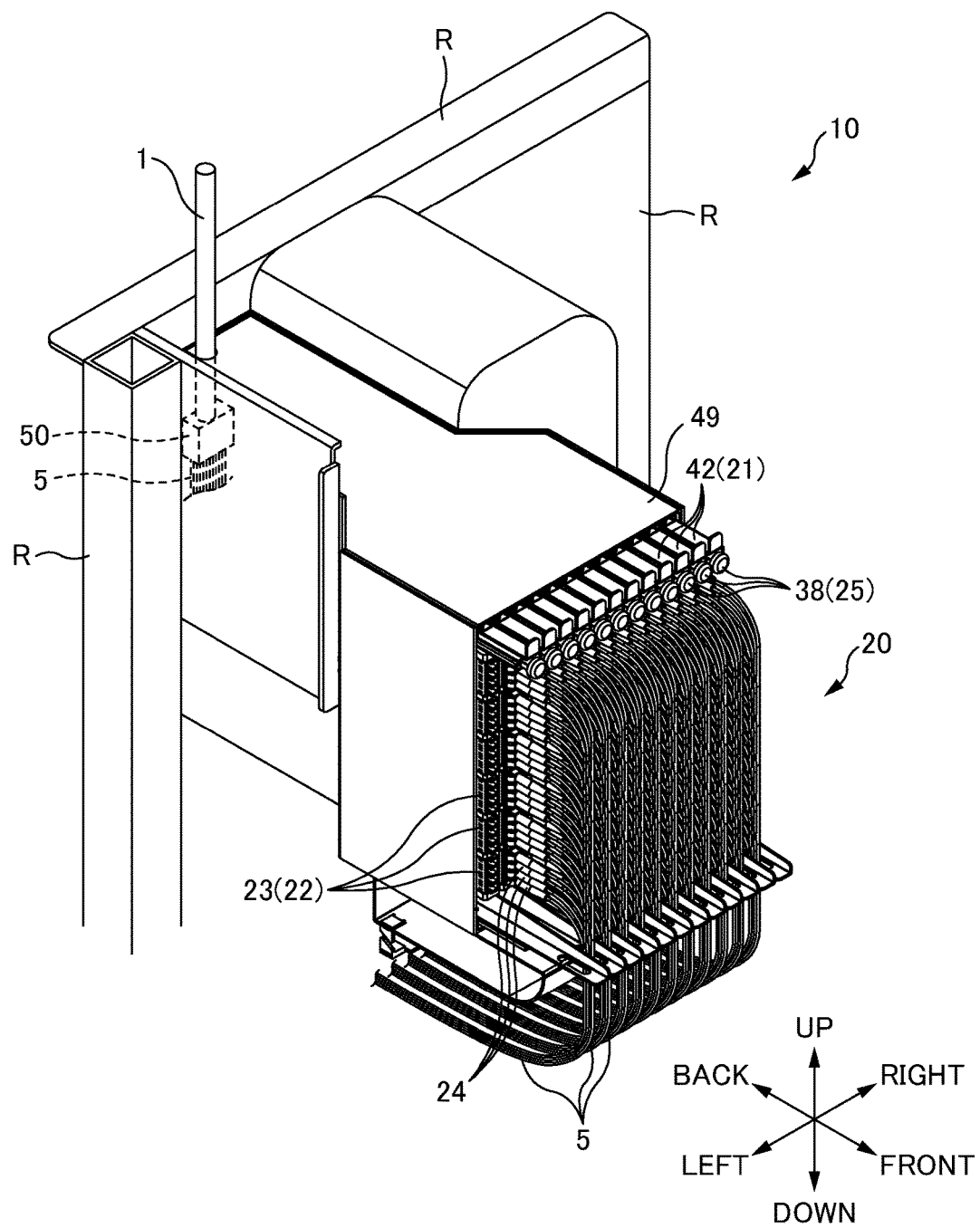
FIG. 2 is an entire perspective view of the optical connection box 10 according to one or more embodiments.
Figure 3:
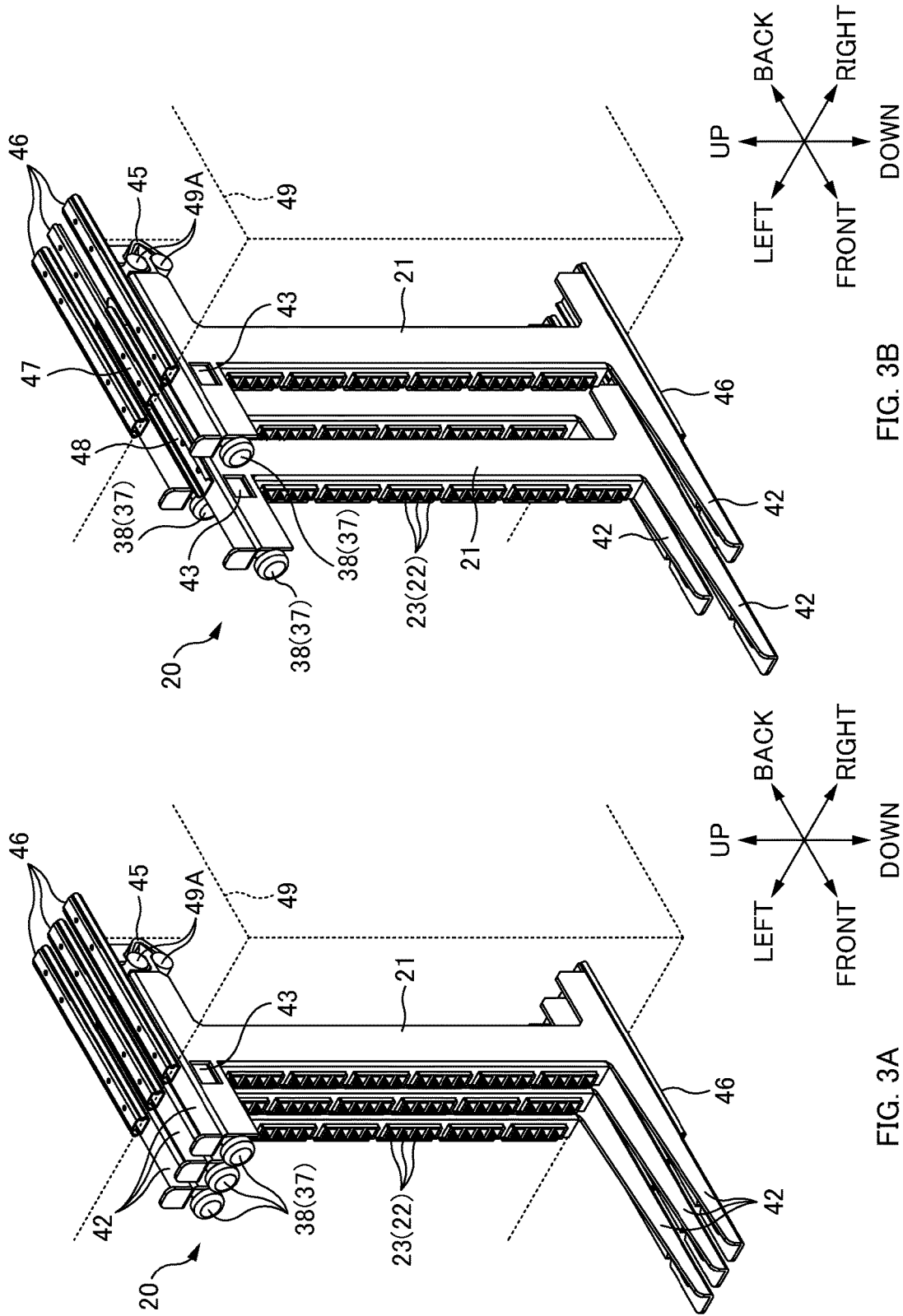
FIGS. 3A and 3B are each a perspective view of an optical wiring unit 20 according to one or more embodiments.
Figure 4:
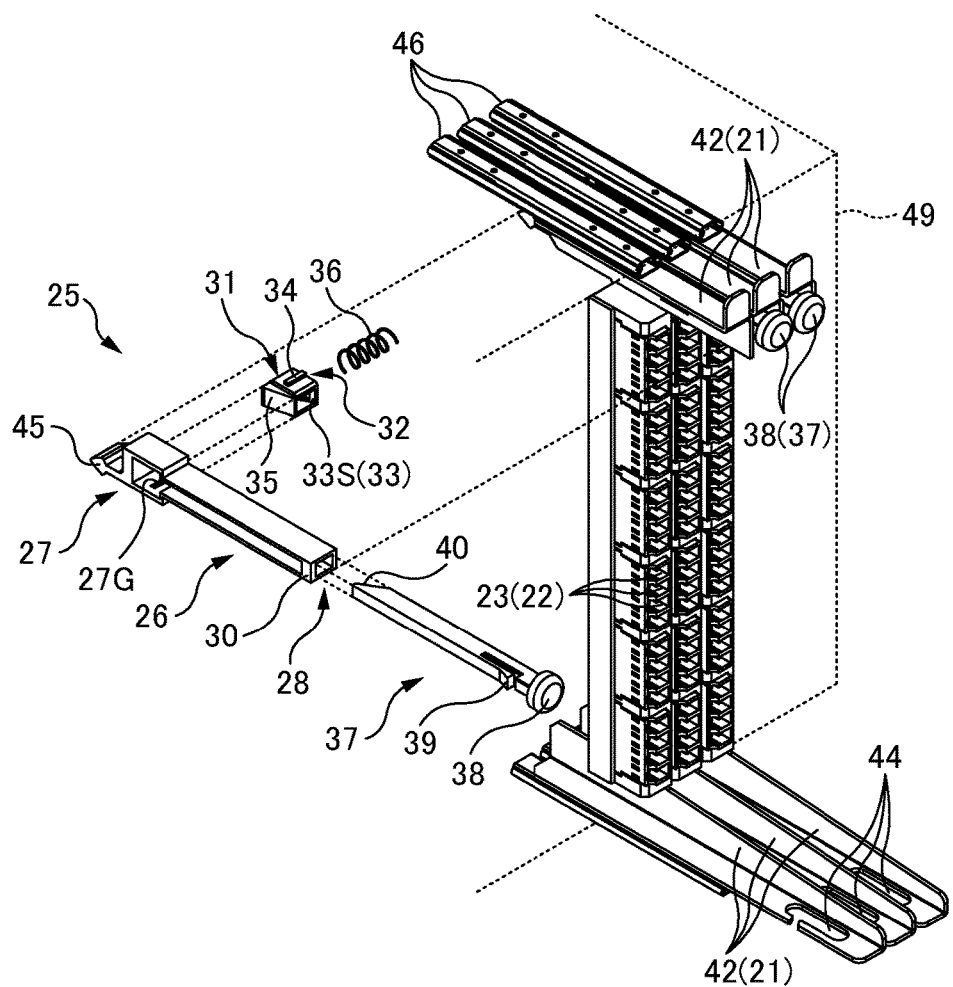
FIG. 4 is a perspective view of the optical wiring unit 20 according to one or more embodiments with a locking section 25 being disassembled.

Optical Wiring Unit 20:

FIG. 2 is an entire perspective view of the optical connection box 10 according to one or more embodiments. FIGS. 3A and 3B are each a perspective view of the optical wiring unit 20 according to one or more embodiments. FIG. 4 is a perspective view of the optical wiring unit 20 according to one or more embodiments with a locking section 25 being disassembled.

In the following description, directions are defined as illustrated in the drawings. That is, a direction in which a drawer 21 is moved (drawn out or pushed inward) relative to a casing 49 is defined as a "front-back direction", and a side to which the drawer 21 is drawn out is defined as a "front" side and an opposite side (to which the drawer 21 is pushed inward) is defined as a "back" side. The front-back direction may be also referred to as a "drawing-out direction". A direction in which a plurality of optical adapters 23 are arrayed in an adapter part 22 is defined as an "up-down direction", and a side on which the locking section 25 is provided in the drawer 21 is defined as an "up" side and an opposite side is defined as a "down" side. A direction perpendicular to the front-back direction and the up-down direction is defined as a "right-left direction", and a right side when the back side is seen from the front side is defined as a "right" side and an opposite side is defined as a "left" side. Note that the right-left direction is also a direction in which a plurality of drawers 21 are arrayed.

As described above, the optical connection box 10 includes the branch section 50 and the optical wiring unit 20. As illustrated in FIG. 2, the branch section 50 and the optical wiring unit 20 are provided to the casing 49. The casing 49 is attached to a rack R so that the optical connection box 10 is fixed to the rack R. The optical cable 1 containing a plurality of optical fibers 5 is branched into the optical fibers 5 by the branch section 50 provided within the casing 49. The branched optical fibers 5 are connected in the casing 49 with the optical wiring unit 20. As described above, the optical wiring unit 20 is a member to attach the optical adapter and the like to the end of each optical fiber 5 branched by the branch section 50 for termination. As illustrated in FIG. 2, the optical wiring unit 20 is provided on the front side of the casing 49 of the optical connection box 10. Each of a plurality of optical adapters 23 (described later) provided to the adapter part 22 (described later) of the optical wiring unit 20 is connected to the optical fiber 5 having the end attached to an optical connector 24.

The optical wiring unit 20 includes the drawers 21 and slide rail parts 46 (see FIGS. 3A and 3B). Note that FIG. 3A is a diagram illustrating a state before drawing out any of the drawers 21. FIG. 3B is a diagram illustrating a state after drawing out one of the drawers 21. Note that FIGS. 3A and 3B each illustrate only three drawers 21 of a plurality of drawers 21 included in the optical wiring unit 20. FIG. 3B illustrates a state that the drawer 21 located at the center of three drawers 21 is drawn out. FIGS. 3A and 3B and the drawings subsequent to FIG. 3B omit illustration of the optical connectors 24 and optical fibers 5 connected to a plurality of optical adapters 23 (described later).

In the following description, as illustrated in FIG. 3A, a state that the drawer 21 is not drawn out may be also referred to as an "initial state" or a "pushed-inward state". A state that the drawer 21 is drawn out, like the drawer 21 located at the center illustrated in FIG. 3B, may be also referred to as a "drawn-out state". In the drawer 21 in the drawn-out state, since the adapter part 22 (described later) is drawn out to a position on the front side than the adapter parts 22 of other drawers 21, a worker can easily perform an insertion and removal operation of the optical connector 24 into and from the optical adapter 23 in the adapter part 22. Then, when the drawer 21 in the drawn-out state is pushed inward, the drawer 21 becomes in the initial state (or the pushed-inward state) again.

Each drawer 21 is a member moved (drawn out or pushed inward) relative to the casing 49 of the optical connection box 10. In the optical wiring unit 20 according to one or more embodiments, the drawer 21 is formed into a plate shape perpendicular to the right-left direction to easily move in the front-back direction relative to the casing 49 of the optical connection box 10 (see FIGS. 3A and 3B). The optical wiring unit 20 according to one or more embodiments includes a plurality of drawers 21. As illustrated in FIG. 2, in the optical wiring unit 20 according to one or more embodiments, twelve drawers 21 are arrayed in the right-left direction. However, an array direction of the drawers 21 and the number of drawers 21 in the optical wiring unit 20 are not limited to the above.

Each drawer 21 includes the adapter part 22, the locking section 25, and a frame 42 (see FIG. 4).

The adapter part 22 is a member to hold the ends of the optical fibers 5 branched by the branch section 50. In the drawer 21 according to one or more embodiments, the adapter part 22 includes a plurality of optical adapters 23. As illustrated in FIG. 4, the adapter part 22 includes six four-core type optical adapters arrayed in the up-down direction, i.e., 24 optical adapters 23 in total. However, an array direction of the optical adapters 23 and the number of optical adapters 23 in the adapter part 22 of the drawer 21 are not limited to the above. The adapter part 22 including a plurality of optical adapters 23 is attached to a side plate part 42S of the frame 42 described later. Each of the optical fibers 5 branched by the branch section 50 is terminated by corresponding one of the optical adapters 23 in the adapter part 22.

Each locking section 25 is a member for locking the drawer 21 to another adjacent drawer 21. The locking section 25 according to one or more embodiments is a member for locking the drawer 21 to another adjacent drawer 21 on the left. However, the locking section 25 may lock the drawer 21 to another adjacent drawer 21 on the right. As the frame 42 moves in the front-back direction relative to the casing 49 of the optical connection box 10, the locking section 25, which is attached to the side plate part 42S of the frame 42, can move together with the adapter part 22 in the front-back direction relative to the casing 49 of the optical connection box 10. The locking section 25 includes a main body part 26, a locking piece 31, a spring 36, and an insertion member (insertion section) 37 (see FIG. 4).

The main body part 26 is a member housing the locking piece 31 (described later) and the insertion member 37 (described later). The main body part 26 is also a member to hold the drawer 21 in the initial state (or the pushed-inward state) with respect to the casing 49 while keeping the initial state (or the pushed-inward state). In the locking section 25 according to one or more embodiments, the main body part 26 is attached to the side plate part 42S of the frame 42 described later on a right edge face of the main body part 26 in a state of holding the locking piece 31 (described later) and the insertion member 37 (described later). The main body part 26 includes a locking piece housing hole 27, an insertion member housing hole 28, and an inserted part 45 (see FIG. 4).

The locking piece housing hole 27 is a part housing the locking piece 31 (described later). As illustrated in FIG. 4, the locking piece housing hole 27 is an opening through the main body part 26 in the right-left direction, in which the locking piece 31 is housed to be movable in the right-left direction relative to the main body part 26. An upper face and a lower face of the locking piece housing hole 27 are formed with guide grooves 27G. The guide grooves 27G are engaged with guide parts 34 of the locking piece 31 in a state that the locking piece 31 is movable in the right-left direction relative to the main body part 26. Thus, the guide grooves 27G extend in a pair on the upper and lower faces of the locking piece housing hole 27 in the right-left direction. However, as illustrated in FIG. 4, the guide grooves 27G are formed on the upper and lower faces of the locking piece housing hole 27 except for a part of each of the upper and lower faces on the left side. In other words, the guide groove 27G is not formed on the part of each of the upper and lower faces of the locking piece housing hole 27 on the left side. Thus, the guide parts 34 abut on ends of the guide grooves 27G at a predetermined position to restrict the moving of the locking piece 31. This can prevent the locking piece 31 (described later) urged leftward from dropping out to the left side of the locking piece housing hole 27.

The insertion member housing hole 28 is a part housing the insertion member 37 (described later). As illustrated in FIG. 4, the insertion member housing hole 28 is an opening which opens in the front-back direction, in which the insertion member 37 is housed to be movable in the front-back direction relative to the main body part 26.

The inserted part 45 is a part to hold the drawer 21 to the casing 49 while keeping the initial state (or the pushed-inward state). The inserted part 45 is held to be pinched by a clip part 49A attached to the casing 49 as illustrated in FIGS. 3A and 3B to hold the drawer 21 to the casing 49 while keeping the initial state (or the pushed-inward state). The drawer 21 with the inserted part 45 being held to be pinched by the clip part 49A can be drawn out when the inserted part 45 comes off the clip part 49A through an operation of drawing out the drawer 21 by the worker.

The locking piece 31 is a part for locking the drawer 21 to another adjacent drawer 21. The locking piece 31 latches on an engaging hole part 43 (described later) provided to the frame 42 (side plate part 42S) of another adjacent drawer 21 to lock the drawer 21. The locking piece 31 is housed in the locking piece housing hole 27 of the main body part 26. The locking piece 31 includes an engagement protrusion 35, an insertion hole 33, and the guide parts 34.

The engagement protrusion 35 is a part that latches on the engaging hole part 43 on the side plate part 42S of the frame 42 described later (see FIGS. 3A and 3B) to lock the drawer 21 to another adjacent drawer 21. The engagement protrusion 35 is formed to protrude more leftward nearer to the backside, and the engagement protrusion 35 moves leftward (to a latching side) relative to the engaging hole part 43 to prevent the drawer 21 from being pushed backward.

The insertion hole 33 is a part into which a tip end of the insertion member 37 (described later) is inserted. The tip end of the insertion member 37 abuts on the insertion hole 33 such that the locking piece 31 can be pressed rightward (to a latch releasing side). In other words, the insertion hole 33 has a locking piece tapered face 33S formed therein which protrudes more leftward the nearer to the backside, and the insertion member 37 includes an insertion member tapered face 40 (described later) formed on the tip end thereof which protrudes more leftward the nearer to the backside. The insertion member tapered face 40 abuts on the locking piece tapered face 33S to push the insertion member 37 backward, which gives a force pushing the locking piece 31 rightward (a latch releasing side) (described later).

The guide part 34 is a part that guides the moving of the locking piece 31 in the right-left direction. The guide parts 34 engage with the guide grooves 27G in a state that the locking piece 31 is movable in the right-left direction relative to the main body part 26. The guide parts 34 are provided in a pair on top and bottom faces of the locking piece 31.

The spring 36 is an elastic member for pressing the locking piece 31 leftward (to a side closer to another adjacent drawer 21, the latching side). The spring 36 is disposed between a spring receiving part 32 of the locking piece 31 and the side plate part 42S of the frame 42. Specifically, a left end of the spring 36 is held by the spring receiving part 32 of the locking piece 31 and a right end of the spring 36 is held by the side plate part 42S of the frame 42.

The insertion member 37 is a member to release the drawer 21 from a state of being locked to another adjacent drawer 21 (hereinafter, also referred to as a "locked state") to a state of not being locked to another adjacent drawer 21 (hereinafter, also referred to as a "lock released state"). The insertion member 37 releases the locking piece 31 from a state of latching on the engaging hole part 43 provided to the frame 42 of another adjacent drawer 21 (side plate part 42S) (hereinafter, also referred to as a "latched state") to a state of not latching on the engaging hole part 43 (hereinafter, also referred to as a "latch released state"). The insertion member 37 is housed in the insertion member housing hole 28 of the main body part 26. The insertion member 37 includes a protruding part 39 and the insertion member tapered face 40 (see FIG. 4).

The protruding part 39 is a part preventing the insertion member 37 from dropping out to the front. The protruding part 39 is a part protruding leftward from the insertion member 37. The protruding part 39 abuts on an abutting part 30 of the main body part 26 to restrict the move of the insertion member 37 frontward (see FIGS. 5A and 5B and the like).

The insertion member tapered face 40 is a part abutting on the locking piece tapered face 33S of the locking piece 31. The insertion member tapered face 40 has a tapered face protruding more leftward the nearer to the backside. The insertion member tapered face 40 abuts on the locking piece tapered face 33S of the locking piece 31 to push the insertion member 37 backward, which gives a force pushing the locking piece 31 rightward (the latch releasing side) (described later).

Each frame 42 is a member holding the adapter part 22 and the locking section 25. Each of upper and lower ends of the frame 42 is provided with a drawing-out side rail 48 of the slide rail part 46 attached thereto, and the drawing-out side rail 48 moves relative to a casing side rail 47 attached to the casing 49 in the front-back direction such that the frame 42 can move in the front-back direction relative to the casing 49. As described above, since the adapter part 22 and the locking section 25 are held on the side plate part 42S of the frame 42, the adapter part 22 and locking section 25 can also move together with the frame 42 in the front-back direction.

The frame 42 includes the engaging hole part 43 and a cable bundling part 44. The engaging hole part 43 is provided to the side plate part 42S of the frame 42, and includes a recess on which the engagement protrusion 35 of the locking piece 31 in the locking section 25 described above latches. The cable bundling part 44 is a part bundling a plurality of optical fibers 5 connected to the adapter part 22. As illustrated in FIG. 2, a plurality of optical fibers 5 connected to the adapter part 22 hang downward and are made to pass through an opening formed as the cable bundling part 44 on a part of the frame. This prevents a plurality of optical fibers 5 connected to the adapter part 22 from separating from each other, which can improve the workability of the insertion and removal operation of the optical connector or the like.

Drawing-Out Operation of Drawer 21:

FIGS. 5A and 5B are each a cross-sectional view illustrating the locking section 25 when the drawer 21 is drawn out. Note that FIGS. 5A and 5B omit the illustration of the spring 36 (which is actually disposed between the spring receiving part 32 of the locking piece 31 and the side plate part 42S) in order to illustrate the operation of the locking piece 31.

FIG. 5A illustrates the drawer 21 in the initial state (the state that the drawer 21 is not drawn out). In other words, the state of the drawer 21 in FIG. 3A described above is illustrated. At this time, the locking piece 31 is in a state of being housed on the rightmost side in the locking piece housing hole 27, where the engagement protrusion 35 abuts on the adjacent left side plate part 42S. The spring 36 is disposed between the spring receiving part 32 and the side plate part 42S with being in a compressed state, and the locking piece 31 is in a state of receiving a pressing force leftward by the spring 36.

On the way from the initial state to the drawn-out state described later (the state that the drawer 21 is drawn out), the drawer 21 (adapter part 22, locking section 25, and frame 42) moves frontward relative to the casing 49. The drawer 21 including the locking piece 31 moves frontward while the engagement protrusion 35 of the locking piece 31 abuts on the adjacent left side plate part 42S.

FIG. 5B illustrates the drawer 21 in the drawn-out state (the state that the drawer 21 is drawn out). FIG. 5B illustrates the drawn-out state of the drawer 21 which is the center one of three drawers 21. In other words, the state of the drawer 21 in the FIG. 3B described above is illustrated. When the drawer 21 is drawn out to a predetermined position, the locking piece 31 in the locking section 25 latches on the engaging hole part 43 provided to the side plate part 42S of the adjacent drawer 21 on the left. As described above, since the locking piece 31 is in the state of receiving the pressing force leftward from the spring 36, when the drawer 21 is drawn out to a predetermined position and the locking piece 31 reaches a position of the engaging hole part 43 provided to side plate part 42S of the adjacent drawer 21 on the left, the locking piece 31 moves leftward (hereinafter, also referred to a "latching direction") such that the locking piece 31 latches on the engaging hole part 43. The locking piece 31 latching on the engaging hole part 43 prevents the drawer 21 from being pushed backward. In other words, the drawer 21 is locked to the adjacent drawer 21 on the left. In this way, the operation only of drawing out the drawer 21 allows the locking piece 31 to latch on the engaging hole part 43 to lock the drawer 21 to the adjacent drawer 21 on the left, which can improve the operability.

Figures 6A, 6B:
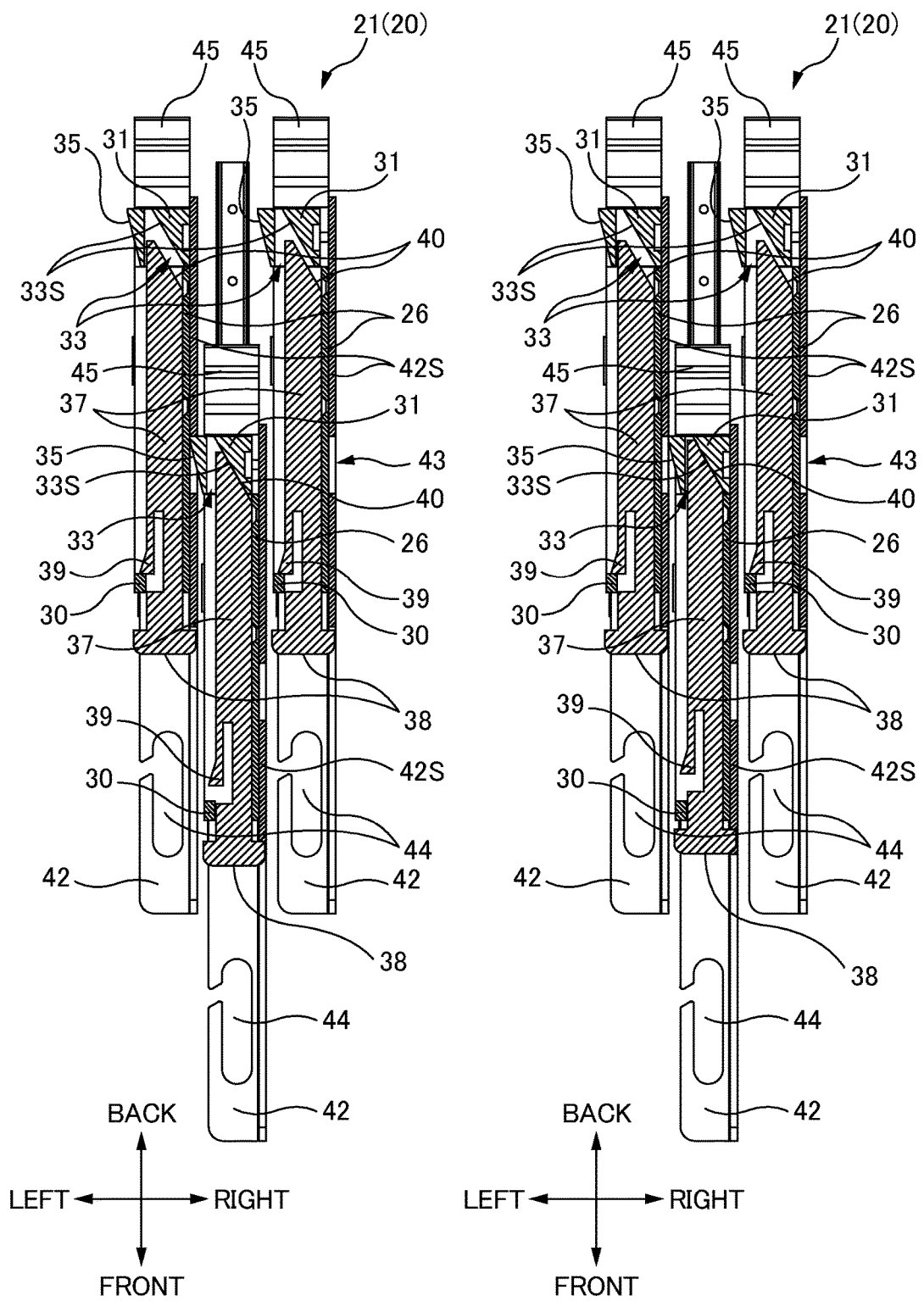
FIGS. 6A and 6B are each a cross-sectional view illustrating the locking section 25 when the drawer 21 is pushed inward.

Pushing-Inward Operation of Drawer 21:

FIGS. 6A and 6B are each a cross-sectional view illustrating the locking section 25 when the drawer 21 is pushed inward. Note that FIGS. 6A and 6B also omit the illustration of the spring 36 (which is actually disposed between the spring receiving part 32 of the locking piece 31 and the side plate part 42S) to illustrate the operation of the locking piece 31. Hereinafter, a description is given of an operation of a lock releasing mechanism (insertion member 37) to release the state that the drawer 21 is locked to the adjacent drawer 21 on the left (locked state).

FIG. 6A illustrates a state that the insertion member tapered face 40 of the insertion member 37 abuts on the locking piece tapered face 33S of the locking piece 31. The worker pressing backward a button 38 provided to a front edge of the insertion member 37 allows the insertion member 37 to move backward such that the insertion member tapered face 40 abuts on the locking piece tapered face 33S of the locking piece 31. As described above, the insertion member tapered face 40 is formed to protrude more leftward the nearer to the backside, and the locking piece tapered face 33S of the locking piece 31 is also a face protruding more leftward the nearer to the backside, similarly. With this structure, when the worker further presses backward the button 38, the insertion member 37 is pushed backward to give a force pressing the locking piece 31 rightward.

FIG. 6B illustrates a state that latching by the engagement protrusion 35 of the locking piece 31 on the engaging hole part 43 is released. The force pressing the locking piece 31 rightward allows the locking piece 31 to move rightward (hereinafter, also referred to as a "latch releasing direction") such that latching by the engagement protrusion 35 of the locking piece 31 on the engaging hole part 43 is released. This can push inward again the drawer 21 which is drawn out to be locked to a predetermined position. In other words, locking of the drawer 21 to the adjacent drawer 21 on the left is released. In this way, since a direction in which the insertion member 37 is operated for releasing the latch (a pushing-inward direction) is the same as a direction in which the drawer 21 is pushed inward, the operability can be improved.

When the drawer 21 is again pushed inward from the drawn-out state, the drawer 21 becomes again in the initial state (pushed-inward state) (see FIG. 5A). In the drawn-out state, in the adjacent drawer 21 on the right of the drawer 21 to be pushed inward, the locking piece 31 does not abut on the side plate part 42S of the drawer 21 to be pushed inward and the locking piece 31 is in a state of protruding from the locking piece housing hole 27. From this state, when the drawer 21 in the drawn-out state is again pushed inward, the locking piece 31 becomes again in the state of abutting on the side plate part 42S. In the locking section 25 according to one or more embodiments, since the engagement protrusion 35 of the locking piece 31 is formed to protrude more leftward the nearer to the backside (formed to be concaved more rightward the nearer to the frontside), the edge of the side plate part 42S is not caught on a corner of the locking piece 31 and the locking piece 31 can again transit to the state of abutting on the side plate part 42S.

Figure 7:
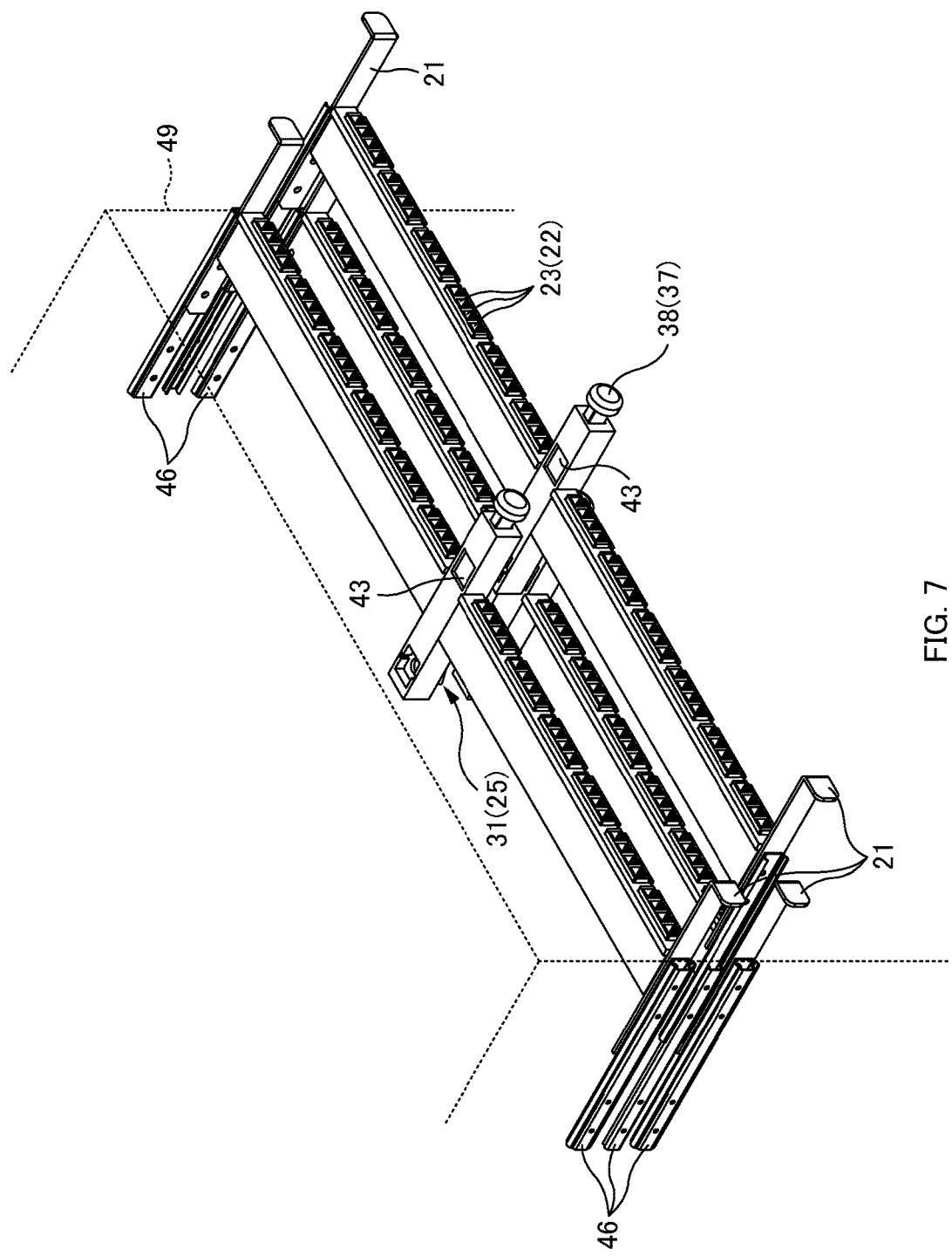
FIG. 7 is a perspective view of an optical wiring unit 20 according to one or more embodiments.

FIG. 7 is a perspective view of an optical wiring unit 20 according to one or more embodiments. In the optical wiring unit 20 according to one or more embodiments described above, a plurality of drawers 21 are arrayed in the right-left direction. However, in the optical wiring unit 20 according to one or more embodiments, a plurality of drawers 21 may be arrayed in the up-down direction. This allows a plurality of adapters 23 in the adapter part 22 to be arrayed from right to left, and thereby, many optical fiber cables extending from the optical adapters hang downward. Thus, the optical fiber cables are not obstacles and the insertion and removal operation of the optical connectors 24 into and from the adapters 23 can be easy to perform. Note that the optical wiring unit 20 according to one or more embodiments also can lock the drawer 21 to another adjacent (upper or lower adjacent) drawer 21 by including the locking section 25.

BRIEF SUMMARY

The optical wiring unit 20 according to one or more embodiments is the optical wiring unit 20 including a plurality of drawers 21 provided with the optical adapters 23. The drawer 21 includes the locking section 25 (a first latch part) and the engaging hole part 43 (a second latch part), and when the drawer 21 is drawn out to a predetermined position, the locking section 25 (the first latch part) of the drawer 21 latches on the engaging hole part 43 (the second latch part) of another adjacent drawer 21 to lock the drawer 21 to the predetermined position. With this structure and/or operation, in one or more embodiments, a high density of a plurality of optical adapters provided to the optical wiring unit can be easily achieved.

In the optical wiring unit 20 according to one or more embodiments, the engaging hole part 43 (the second latch part) is provided at a distance from the locking section 25 (the first latch part) in a drawing-out direction, the distance being a movement distance of the drawer 21 when the drawer 21 is drawn out to a predetermined position. This allows the locking section 25 (the first latch part) to latch on the adjacent engaging hole part 43 (the second latch part) by only drawing out the drawer 21 to a predetermined position in one or more embodiments.

In the optical wiring unit 20 according to one or more embodiments, the locking section 25 (the first latch part) is urged toward the adjacent drawer 21. This allows the locking section 25 (the first latch part) to latch on the adjacent engaging hole part 43 (the second latch part) by only drawing out the drawer 21 to a predetermined position in one or more embodiments.

In the optical wiring unit 20 according to one or more embodiments, the first latch part is the locking section 25 and the second latch part is the engaging hole part 43 to which the locking section 25 is engaged. This allows the locking section 25 (the first latch part) to latch on the adjacent engaging hole part 43 (the second latch part) by only drawing out the drawer 21 to a predetermined position in one or more embodiments.

The optical wiring unit 20 according to one or more embodiments further includes a lock releasing mechanism that releases locking of the drawer 21 from a predetermined position. This can push inward again the drawer 21 which is drawn out to be locked to a predetermined position in one or more embodiments.

The lock releasing mechanism includes the insertion member 37 inserted between the locking section 25 (the first latch part) and the engaging hole part 43 (the second latch part). This can release latching of the locking section 25 (the first latch part) which latches on the adjacent engaging hole part 43 (the second latch part) in one or more embodiments.

Figure 8:
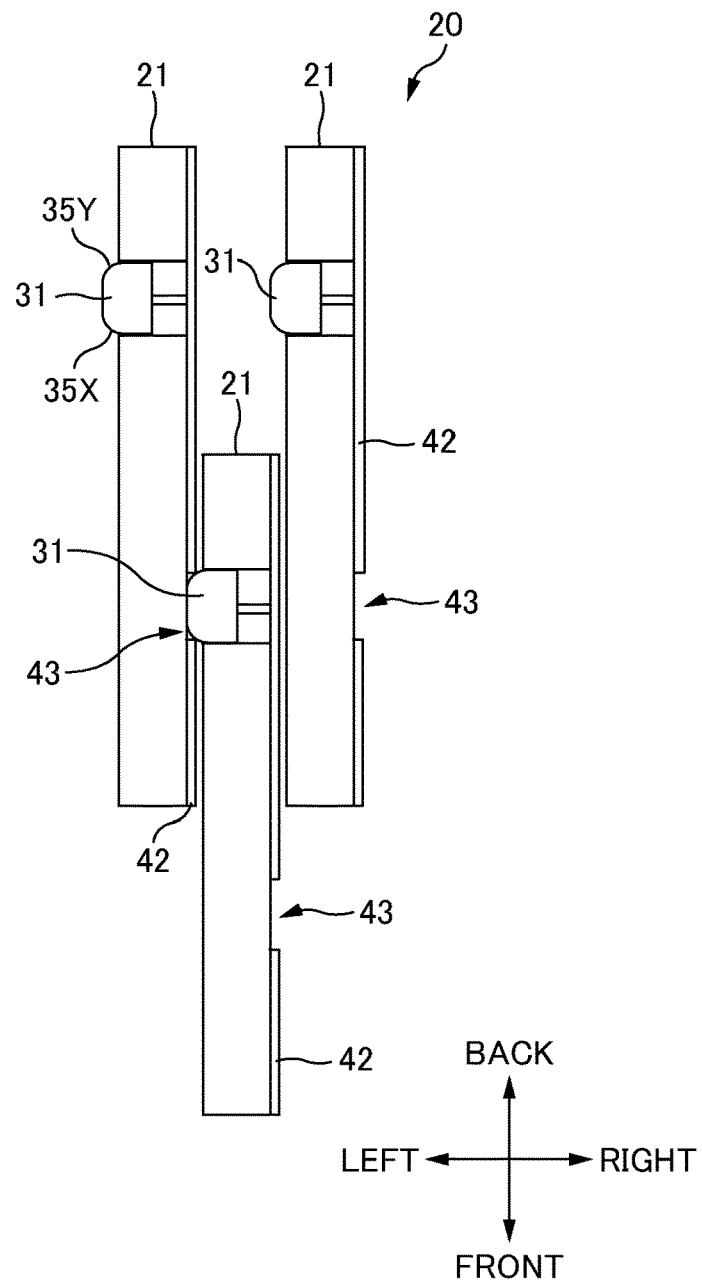
FIG. 8 is a diagram illustrating a modification example of the locking section 25.

Modification Example of Locking Section 25:

FIG. 8 is a diagram illustrating a modification example of the locking section 25. In the locking section 25 according to the above-described embodiments, the engagement protrusion 35 of the locking piece 31 latches on the engaging hole part 43 of another adjacent drawer 21 to lock the drawer 21 to another adjacent drawer 21. Then, the engagement protrusion 35 of the locking piece 31 is formed to protrude more leftward the nearer to the backside. In other words, the edge face of the engagement protrusion 35 on the left side thereof (on a side closer to another adjacent drawer 21) is a tapered face protruding more leftward the nearer to the backside. However, as illustrated in FIG. 8, in the modification example of the locking section 25, the engagement protrusion 35 of the locking piece 31 is formed into a shape having part of cylindrical surfaces on the front and back sides (a part of cylindrical surface 35X to front side and a part of cylindrical surface 35Y to back side). In the locking section 25 according to the present modification example also, similarly to the above-described embodiments, the engagement protrusion 35 of the locking piece 31 can latch on the engaging hole part 43 of another adjacent drawer 21 to lock the drawer 21 to another adjacent drawer 21. Note that FIG. 8 illustrates the drawn-out state of the drawer 21 which is the center one of three drawers 21.

In the above-described embodiments, the insertion member 37 releases the latched state of the locking piece 31 on the engaging hole part 43 of another adjacent drawer 21, but the insertion member 37 is not necessary in the present modification example. In other words, strongly pushing inward the drawer 21 in the drawn-out state allows the locking piece 31 to move rightward (to the latch releasing direction) in such a way that the part of cylindrical surface to back side 35Y of the locking piece 31 slides along an edge of the engaging hole part 43.

The foregoing embodiments are for facilitating the understanding of the present invention, and are not to be construed as limiting the present invention. The present invention may be modified and/or improved without departing from the gist thereof, and it goes without saying that the present invention encompasses any equivalents thereof.

Further, although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An optical wiring unit comprising:
   a plurality of drawers comprising optical adapters, wherein
   the optical wiring unit is provided with a casing,
   each of the drawers is moved relative to the casing and includes a first latch and a second latch,
   when one of the drawers is not drawn out to a predetermined position, the first latch of the drawer does not latch onto the second latch of an adjacent drawer, and
   when any of the drawers is drawn out to the predetermined position, the first latch of a drawn-out drawer moves toward the second latch of the adjacent drawer and latches onto the second latch of the adjacent drawer to lock the drawn-out drawer to the predetermined position.

2. The optical wiring unit according to claim 1, wherein:
   the second latch of each of the drawers is disposed at a distance from the first latch of each of the drawers in a drawing-out direction, and
   the distance is a movement distance of the drawn-out drawer when the drawn-out drawer is drawn out to the predetermined position.

3. The optical wiring unit according to claim 1, wherein:
   the first latch is urged toward the adjacent drawer.

4. The optical wiring unit according to claim 1, wherein:
   the first latch of each of the drawers is a locking section and the second latch of each of the drawers is an engaging hole that engages with the locking section.

5. The optical wiring unit according to claim 1, further comprising:
   a lock releasing mechanism that releases locking of the drawn-out drawer from the predetermined position.

6. The optical wiring unit according to claim 5, wherein:
   the lock releasing mechanism includes an insertion member inserted between the first latch of the drawn-out drawer and the second latch of the adjacent drawer.

\* \* \* \* \*